Sept. 16, 1930.  E. C. MIKKELSEN  1,775,909
TRUCK END GATE
Filed April 1, 1929  2 Sheets-Sheet 1
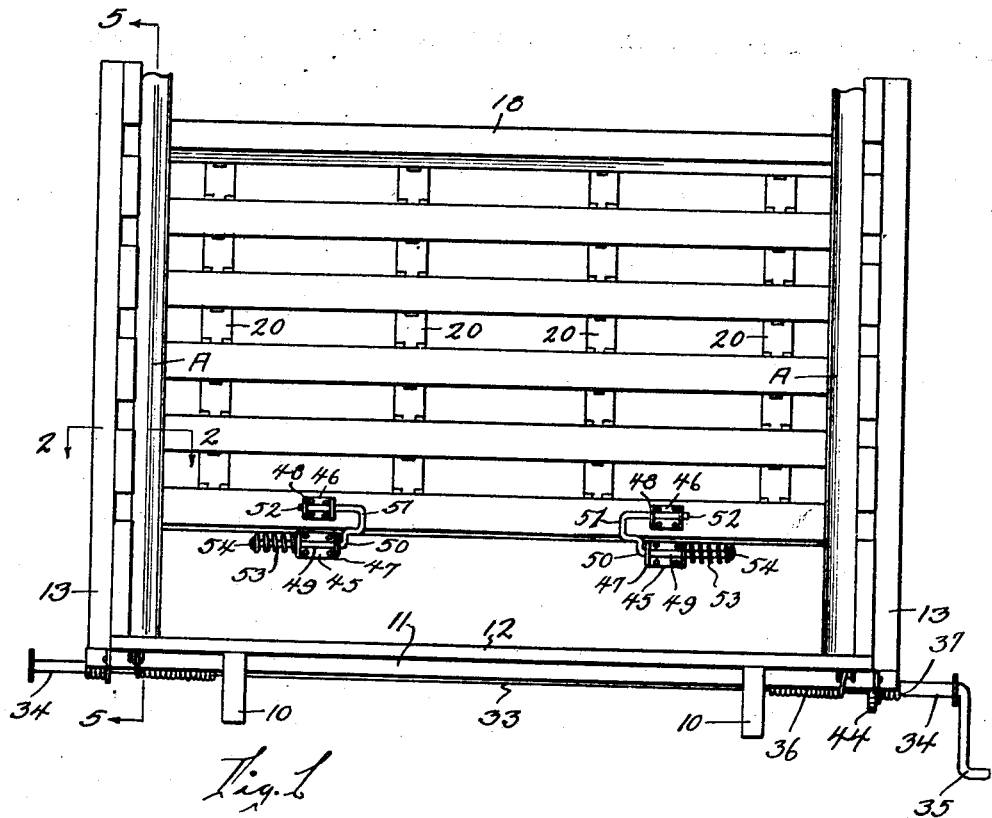
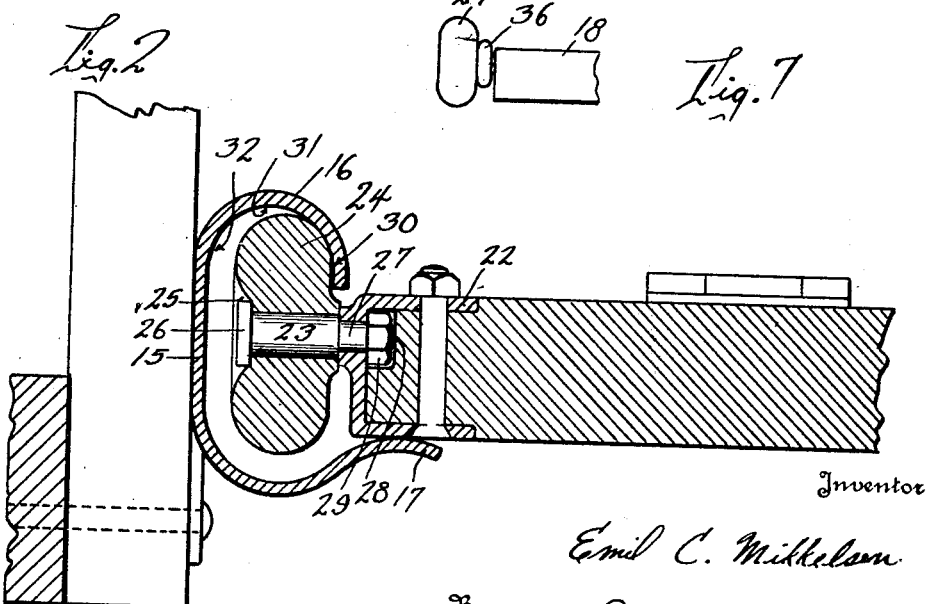
Inventor
Emil C. Mikkelsen
By Lynn H. Latta
Attorney Sept. 16, 1930.  E. C. MIKKELSEN  1,775,909
TRUCK END GATE
Filed April 1, 1929  2 Sheets-Sheet 2
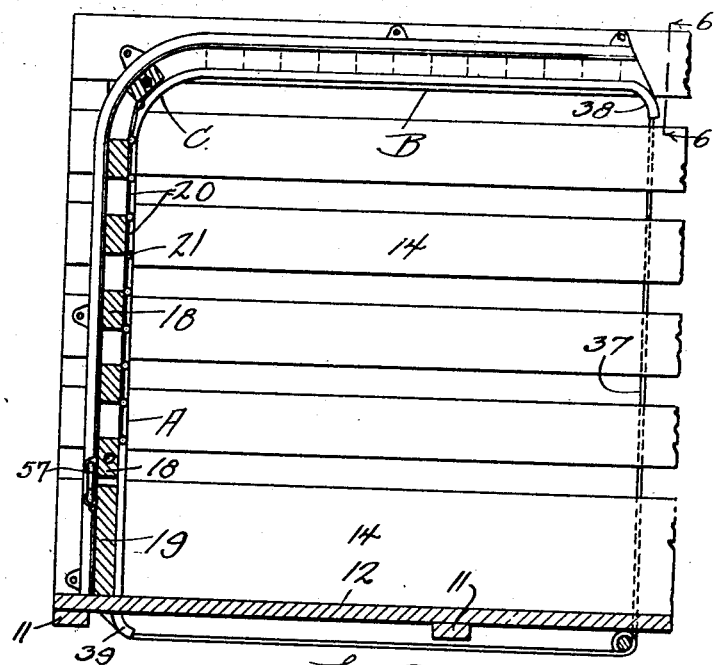
Fig. 3
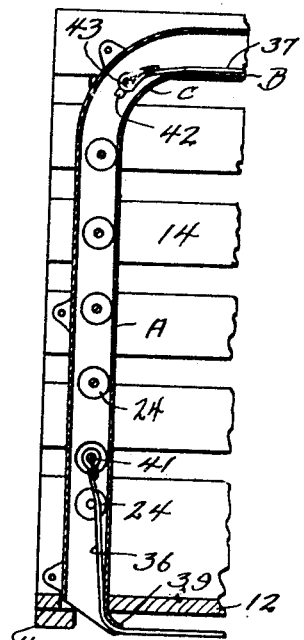
Fig. 5
Fig. 6
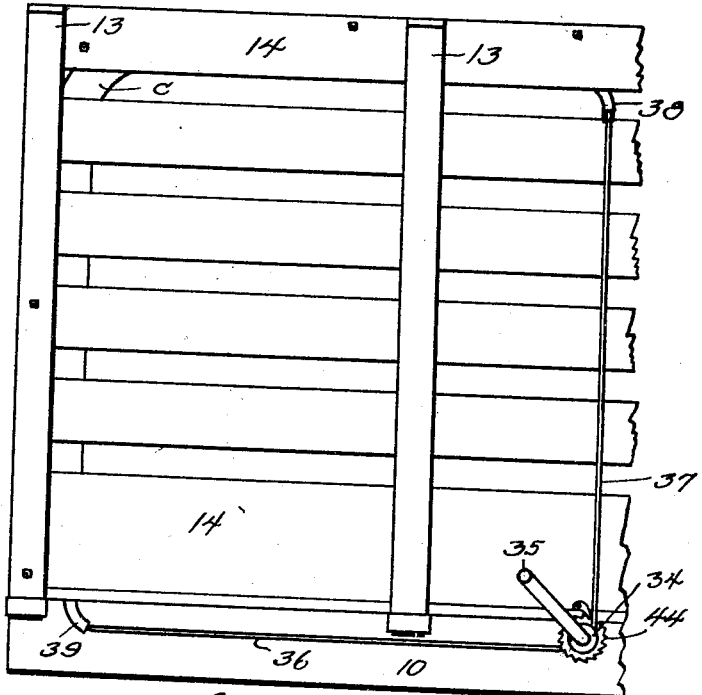
Fig. 4
Inventor
Emil C. Mikkelsen
By Lynn H Latta
Attorney Patented Sept. 16, 1930

1,775,909

UNITED STATES PATENT OFFICE

EMIL C. MIKKELSEN, OF YANKTON, SOUTH DAKOTA

TRUCK END GATE

Application filed April 1, 1929. Serial No. 351,750.

My invention relates to end gates and has for its object to provide improved end gate construction in which the end gate can be opened while the truck or wagon to which the end gate is applied is backed up against a loading dock, chute or the like. Stated in other words, the invention has for its object to provide an end gate which may be opened without the necessity of utilizing any of the space directly behind the end gate during the opening process.

The invention has its primary utility when applied to a stock truck such as is used for hauling pigs, hogs, cattle and the like and makes it possible to load or unload the stock truck without the danger of any of the stock being injured. For example, in the ordinary end gate construction, it is necessary to remove the end gate from behind and to do this the truck must be spaced somewhat away from the loading dock or chute when the animals are to be removed from the truck. It has often happened that a pig or animal will be pushed or will jump from the truck before an opportunity has been had to back the truck up to the loading dock or chute. By providing an end gate which can be opened while the truck is closely adjacent the loading dock or chute the possibility of injury to the animals from this cause is eliminated.

A further object of my invention is to provide an end gate which can be easily operated by means of a windlass device through the medium of which the leverage or force exerted by the operator may be multiplied so as to reduce the amount of force required for moving the gate.

My invention is embodied generally in a gate which may be termed an apron type gate comprising a plurality of sections hinged together on horizontal axes and slidably mounted at their ends in suitable guides, whereby the gate may be raised vertically to the top of the truck body and thence make a right angle turn and travel in a horizontal direction between the upper extremities of the sides of the truck body.

Another object is to provide such a construction in which the gate serves not only the above mentioned objects but serves also as a brace connecting the sides of a truck body.

A further object is to provide a device of this character in which the lower section of the gate may be disconnected from the upper section of the gate without interfering with the movement of the upper section by means of the windlass mechanism or may be caused to travel with the upper section as desired.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a rear view of a truck body embodying my invention.

Fig. 2 is a detail, sectional view taken on the line 2—2 of Fig. 1.

Fig. 3 is a vertical, longitudinal, sectional view through the truck body.

Fig. 4 is a side elevation of the truck body.

Fig. 5 is a vertical, longitudinal, sectional view taken on the line 5—5 of Fig. 1.

Fig. 6 is a detail, sectional view taken on the line 6—6 of Fig. 3.

Fig. 7 is a detail view showing the connection between the roller shaft and cable.

My invention is applied to an ordinary truck body having the longitudinal sills 10, the cross bars 11, the floor 12, the upright posts 13 and the side boards 14.

It may be noted that there are no cross braces between the sides of the truck body at the rear extremity thereof above the bottom. No cross braces are necessary in this region, their function being displaced by the end gate of my invention.

The end gate is supported by and travels between a pair of rails, each including a vertical portion A, a horizontal portion B and a curved corner portion C.

All parts of the rail are identical in cross section and a cross sectional view of the rail is shown in detail in Fig. 2. The rail comprises a flat web portion 15, a channel 16 and a flange 17, which lies generally in a plane perpendicular to the web 15. The flange 17 extends a substantial distance beyond the edge of the channel 16 in a direction perpendicularly away from the web 15.

It will now be seen that the rail is generally C shaped in cross section, including on one side, a flange which projects beyond the main body of the rail.

The end gate proper comprises an upper series of comparatively narrow slats 18 and a lower, wider slat 19. The slats 18 are all secured together by some flexible medium having sufficient strength, such as a chain of hinge elements 20, hinged together to form the hinges 21. The hinges 21 are located equidistantly apart in order to give maximum flexibility. Where the slats 18 are spaced apart distances equal to their width, the hinges 21 will preferably be located at the corners of the slats as shown in order to enable the securing of the full width of the alternate hinge elements 20 to the slats.

Each of the slats 18, with the exception of the upper slat, is secured at each end in a socket 22 of cast iron or the like, which socket is provided with a stud 23, projecting from the end of the slat in parallel relation with the axis thereof and upon which is journalled a roller 24.

The roller 24 has the shape generally of an oblate spheroid, being provided with a depression 25 to receive the head 26 of the stud 23.

In order to secure the stud 23 in the socket 22 so that there will be no danger of its becoming loosened or removed, it may be provided with a squared shank 27, received in a squared opening in the socket and terminating in a threaded portion 28 to receive a nut 29.

It will now be seen that the rim of the roller 24 is adapted to engage the channel 16 in any one of three directions, either at the point 30, the point 31 or the point 32.

Thus the roller serves to resist either pulling or pushing pressure between the side of the truck and the end gate in directions parallel to the plane of the end gate or to support the end gate in the bottom of the channel 16 when pressure perpendicular to the plane of the end gate in an inward direction is applied, such as, for instance, when the weight of the end gate is transmitted to the rail portion B.

Furthermore, the construction of the roller is such that a rounded bearing surface is provided for engagement with the rail at any one of the points 30, 31 or 32.

Thus the end gate serves as a brace connecting the sides of the truck and yet its movement relative to the sides is at all times facilitated by the bearing action of the rollers.

The windlass mechanism comprises a windlass shaft 33, which is extended through suitable bearings not shown in the sills 10 and which is provided with the outer windlass drums 34. A crank 35 is provided for one end of the shaft. Cables 36 are secured to the inner windlass shaft portion 33, wound therearound and thence extended to the lower extremity of the upper end gate section. Cables 37 are wound upon the drums 34 and secured to the upper extremity of the end gate.

The rail section B terminates in a downwardly and outwardly curved channel element 38, which extends through the space between the two upper side boards 14 and forms a continuation of the channel 16.

The rail section A terminates at its lower end in a forwardly curved channel element 39, also comprising a continuation of the channel 16. The cables 36 extend on the inner sides of the sills 10 from the shaft portion 33 around the channel elements 39 and thence to the shafts 41 extended through the lower slat 18, on the ends of which are journalled the rollers 24 of the lower slats.

The cables 37 are extended from the windlass drums 34 on the outer sides of the truck side members to the channel elements 38, which guide them to the rail portions B. Through the channels 16 of the rail portions B, the cables 37 extend to the hooks 42, formed on the ends of rods 43, extended through the upper slat 18.

The cables 36 are secured between the rollers 24 and the ends of the slats as shown in Fig. 7 and at their upper ends are outside of the channels 16. Due to the fact that the shaft 43 has to travel around the corner C, it is impossible to employ rollers for the shaft 43, as they would interfere with the proper movement of the cables 37 in the channels 16.

A ratchet device 44, which is of common construction, is employed to secure the windlass against movement in a direction to allow the gate to drop.

The ratchet device may of course be released when it is desired to lower the gate.

The lower slat 19 is provided with rollers 24 and is linked to the lower slat 18 by the latch elements shown in Fig. 1. These comprise a pair of brackets 45 and 46, having perforated ears 47 and 48, respectively. In the ears 47 is journalled the shaft 49 of the latch hook, which shaft is provided with a shoulder 50 to engage one of the ears 47 to limit movement of the hook in one direction and which is provided with a handle 51 and a bolt element 52, the latter being receivable through the ears 48.

A spring 53 is compressed between one of the ears 47 and a head 54 on the shaft 49 and serves to retain the bolt 52 in engagement with the ears 48, while allowing the bolt to be retracted by pulling upon the handle 51.

The latch elements are adapted to serve as hinge means allowing the slats 18 and 19 to hinge relative to each other when it is desired to lift the lower slat 19 with the rest of the end gate.

In many cases, the lower slat 19 is allowed to remain in position while only the upper section of the end gate is lifted.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In combination with a vehicle body having sides, a guide rail secured to each side, each rail being substantially C-shaped in cross section and comprising an inner channelled portion, an intermediate web portion positioned parallel to its side to which it is secured, and an outer flange portion positioned generally perpendicular to the web portion, the guide rails including perpendicular portions and horizontal portions adapted to support an end gate in a horizontal position, and an end gate including portions projecting into the guide rails and rollers journalled on said projecting portions on axes parallel to the plane of the end gate, supported against axial movement away from the end gate and engaged in the channel portions in such a manner as to connect and brace the sides of the vehicle against spreading, said outer flanges serving to engage the portions of the end gate which project into the rails, to support the end gate against pressure from within the vehicle.

2. In combination with a vehicle body having sides, a guide rail secured to each side, each rail being substantially C-shaped in cross section and comprising an inner channelled portion, an intermediate web portion positioned parallel to the side to which it is secured, and an outer flange portion, the guide rails including perpendicular portions and horizontal portions adapted to support an end gate in horizontal position, and an end gate including portions projecting into the guide rails and rollers journalled on said projecting portions on axes parallel to the plane of the end gate, supported against axial movement away from the end gate and engaged in the channel portions in such a manner as to connect and brace the sides of the vehicle against spreading, and to provide rolling support for the end gate while travelling in the horizontal portions.

3. In combination with a vehicle body having sides, a guide rail secured to each side, each rail being substantially C-shaped in cross section and comprising an inner channelled portion, an intermediate web, and an outer flange portion, the web being positioned parallel to the side to which its rail is secured, and an end gate including portions projecting into the rails and rollers journalled on said portions on axes parallel to the plane of the end gate, supported against axial movement away from the end gate and engaged in the channel portions in such a manner as to connect and brace the vehicle sides against spreading, said outer flanges being positioned to engage the portions of the end gate which project into the rails, to support the end gate against pressure from within the vehicle.

4. In an end gate constructon, in combination with a vehicle body having a bottom and sides, a pair of vehicle guide rails secured to the sides, an apron-like end gate proper slidingly mounted at its ends in the guide rails and adapted to be raised, a lower end gate section also vertically slidable between the rails and latch elements detachably connecting the lower end section with the end gate proper, said latch elements including loop-shaped keepers secured to the end gate proper with the loops positioned in perpendicular planes, bearing brackets secured to the lower end gate section below said keepers, slidable connecting members each including a bolt portion and a trunnion portion positioned parallel to each other, a handle portion connecting said bolt and trunnion portions to form a generally U shaped member, said handle portion being connected to the trunnion portion by a shoulder adapted to engage the bearing bracket to hold the handle portion away from the bracket and a coil spring mounted on the trunnion portion and engaging the bearing bracket to hold the connecting member in a position wherein said shoulder engages the bracket, the latch members being arranged so that the bolts move toward each other in order to be disengaged from their respective keepers.

Signed this 19th day of March, 1929, at Irene, South Dakota.

EMIL C. MIKKELSEN.